Patented Mar. 17, 1953

2,631,994

UNITED STATES PATENT OFFICE 2,631,994

CROSSLINKING ORGANO-POLYSULFIDE RUBBER

Theodore A. Te Grotenhuis, Olmsted Falls, and Gilbert H. Swart, Akron, Ohio, assignors to The General Tire and Rubber Company, Akron, Ohio, a corporation of Ohio No Drawing. Application September 21, 1949, Serial No. 117,067

2 Claims. (Cl. 260—79.1)

This invention relates to the production of a synthetic rubberlike material. It particularly relates to a rubbery reaction product of saturated and unsaturated organic compounds with inorganic polysulfides.

Rubberlike reaction products of alkaline polysulfides and either saturated or unsaturated organic compounds having two carbon atoms with a substituent capable of being split off during the reaction have heretofore been proposed and manufactured. Those condensation products of alkaline polysulfides with saturated organic compounds such as alkylene dihalides, e. g., ethylene dichloride, propylene chloride, or with dichloro-ethers, are extremely resistant to chemicals, solvents and aromatic oils but have relatively low tensile strength, elasticity and abrasion resistance. They are especially undesirable for several uses because they have poor resistance to cold flow and only fair vulcanizability and general workability, as distinguished from some of the other commercial synthetic rubbers.

It is an object of the present invention to provide a vulcanizable rubbery reaction product or condensation product of alkaline polysulfides and organic compounds, which product is extremely resistant to light, chemicals and the like but has less tendency for cold flow than have the reaction products of compounds such as olefin dihalides and alkaline polysulfides heretofore prepared.

It is a still further object of the present invention to provide a method of making a rubbery product utilizing an inorganic polysulfide, which product has high resistance both to chemicals as well as to cold flow.

Other objects will be apparent from the following description of the invention.

In our prior application Serial No. 476,214, filed February 17, 1943, part of which matured into United States Letters Patent 2,445,191, we described the crosslinking of polysulfide rubbers by suitably incorporating spaced crosslinking groups selected from hydroxyl, amino and olefine groups into the polymer chain, and reacting such groups with an appropriate crosslinking compound, which may be dicarboxylic acid anhydride thereof, di-isocyanate or vulcanization agent for olefinic polymers such as sulfur. The crosslinking groups were disclosed as being spaced in the average polymer chain to provide but one crosslinking group for each ten up to a high limit of five hundred carbon atoms of the polymer. The present application is a continuation-in-part of our application Serial No. 708,936, filed November 9, 1946, now abandoned, and copending with tne application that matured into United States Letters Patent 2,445,191.

In accordance with the present invention, rubberlike polymers of improved resistance to cold flow after vulcanization are obtained by reacting an alkaline polysulfide, which has at least two and preferably about three to five sulfur atoms per molecule, with a mixture of one or more saturated base compounds and one or more "substitute" compounds or crosslinking compounds, i. e. organic compounds containing at least one hydroxyl or amino group in addition to the substituents which are affected by reaction with the inorganic polysulfide. The base compounds (this term is herein used to designate compounds having an absence of groups for crosslinking) are preferably entirely saturated and are present in major proportion and have two, and preferably only two substituents such as halogen which are capable of being split off during the polymer-forming reaction. These substituents are connected to different connected carbons. The substituted or crosslinking compounds (having a hydroxy and/or an amino group for crosslinking) are present in only minor proportions to provide for cross linkage during vulcanization with agents effecting cross linkage between said substituted (hydroxyl and/or amino) groups. Since these groups apparently may be in large measure reacted during vulcanization with dicarboxylic acid, anhydride or chloride, or di-isocyanate, there is no appreciable decrease in chemical resistance of the rubbery material. The substituted or crosslinking compounds like the base compound or compounds contain two groups, such as halogen, which are split off during the polymer-forming reaction.

The amount of substitute or crosslinking compounds for crosslinking should preferably be much less than the amount of base compound. The more desirable amounts or molar proportions vary with the molecular length or molecular weight of the compounds, exclusive of substituents, and with the number of crosslinking groups in the molecule of crosslinking compound. To materially decrease cold flow, the proportions of the materials should be chosen so that at least one such crosslinking group is present for each 400 or 500-chain carbon atoms in the final unvulcanized rubberlike molecules, and as much as one such group for each 10 or 15 carbon atoms may be used, although at the higher proportions of crosslinking compound resistance of the polymer to chemicals may be somewhat less. Preferably, the amounts of the substituted and unsubstituted compounds are chosen so that there is one crosslinking group selected from the group consisting of hydroxyl and amino groups for about each 100 to 300 carbon atoms.

It is desirable that the base compound and the cross-linking compounds be comiscible or cosoluble in the proportions used and that the compounds have some solubility in the aqueous media containing the inorganic polysulfide. For the best results, the saturated and substituted compounds (each containing two halogen or other groups split off by contact alkaline polysulfides) should have solubilities in the aqueous media containing the inorganic polysulfide in about the proportions of their concentrations in the mixture, so that reactivity of the base and crosslinking compounds will be more nearly related to their concentration and a relatively uniform distribution of the crosslinking groups will occur within the rubber molecules. When the unsaturated compound is insufficiently soluble in water, the solubility may be adjusted to the required magnitude by incorporating varying amounts of a mutually miscible solvent, such for example as a lower alcohol, ketone, etc., with the materials containing the two substituents, such as halogen, split off in the polymer-forming reaction.

The saturated compounds which preferably furnish the major portion of the hydrogen and carbon in the rubbery polymers of the present invention may be: an olefin dihalide, e. g. ethylene propylene or butylene chloride or bromide; a disubstituted ether, e. g. beta-beta'-dichlorodiethylether; or other saturated compounds containing two and only two halogen or other substituents, one of which is attached to each of two different carbon atoms, which substituent is split off by reaction with the polysulfide. Some unsaturated compound, such as dichloropropylene (epidichlorohydrins, allylene dichloride) dichloroethylene, butadiene dichloride, and homologues of dichloro- and dibromo-propylenes having substituents attached to different carbon atoms, which are split off during the reaction with the alkaline polysulfides, may also be present as part of the base compound, but are preferably absent.

The crosslinking compound or compounds as aforementioned contain in addition to the two substituents, such for example as halogens, etc. that are to be reacted with the inorganic polysulfide, at least one member of the group consisting of hydroxyl and amino groups. Examples of suitable compounds which contain such crosslinking groups for reaction with one or more crosslinking compounds are: 2,4-dichloroaniline; 2,4-dibromoaniline; alpha-beta-glycerol dichlorohydrins; 2-amino-1,3-dichloropropane; dichlorophenols; 2-amino-3-hydroxy-1,4-dichlorobutane; and the corresponding compounds containing bromine in place of chlorine; etc. In fact any hydroxy and/or amino dichloro-aliphatic or aromatic compound may be used, but those which are aliphatic are preferred. These compounds in admixture with other dichlorodisubstituted compounds are reacted with the inorganic polysulfides to produce solid condensation products which are vulcanizable by reaction with suitable crosslinking agents milled into the rubbery material.

As a crosslinking agent to be mixed with the rubbery polymer or condensation product during the compounding thereof, any material which is a polycarboxylic acid in liquid water may be used. Such materials are the polycarboxylic acids themselves, their acid anhydrides, and their acid chlorides. The latter two materials are completely transformed into the corresponding acids. Esters and amides, which may be considered to be hydrolyzed to a slight extent in water, are not considered as materials that are dicarboxylic acid in liquid water. Any organic polyisocyanate (containing a plurality of —N=C=O radicals) may be used with the rubbery polymers containing the spaced hydroxy or amino groups in place of or inconjunction with the polycarboxylic acids, etc.

Examples of suitable materials which in liquid water are dicarboxylic acids are: (1) the dicarboxylic aromatic acids such as phthalic acid, terephthalic acid, dicarboxylic naphthenic acid, etc.; (2) the dicarboxylic aliphatic acids including saturated alkane dicarboxylic acids, such for example as succinic, malonic and sebacic acids; (3) the unsaturated aliphatic or alkylenyl dicarboxylic acids such for example as the alpha-beta unsaturated dicarboxylic acids, maleic, methylmaleic, ethylmaleic, fumaric, citraconic glutaconic and itaconic acids, etc.

The dicarboxylic aliphatic acids themselves may even have a hydroxy group present, such as malic acid. Such acids are not as desirable as those in which the carboxyls are attached to hydrocarbon groups and should be used in larger quantities.

Anhydrides of any of the above acids are preferred to the acids themselves and the acid chlorides may even be used, although such are objectionable from the handling standpoint due to the decomposition products involved.

Since in the case of organic polyisocyanates, it is the isocyanate groups alone that enter into reaction, it matters little what is between these groups as spacers, except that it is an organic group to provide increased compatibility with the polymer and space between the functional groups to permit the two groups of a single molecule to react with two polymer molecules. Examples of the polyisocyanates which may be used are the aliphatic di-isocyanates, including alkylene di-isocyanates such as ethylene, hexylene, butylene and decyl di-isocyanates having the isocyanate groups on different carbon atoms. The aromatic naphthalene di-isocyanates, and the alkyl or alkylene di-isocyanates are preferred, however.

The alkaline polysulfide which is usually used for reaction with halogen-substituted compounds may be prepared in any suitable way, as by boiling a slurry of lime or alkali metal hydroxide for several hours with sufficient sulfur to form a polysulfide of at least four atoms to the molecule; by fusing sulfur with disodium disulfide; etc. The higher sulfur concentration tends, upon reaction with the organic constituents, to form the softer rubberlike products. Except for the substitution of the crosslinking compounds in the above-designated proportions for part of the other disubstituted organic materials, the preparation of the polymer may be identical with that described in the Patrick United States Letters Patent 2,195,380, 2,221,650, 2,363,614, 2,363,615, etc.

The bifunctional crosslinking agents function to connect the hydroxy or amino groups of two molecules together by direct chemical bonds. 1 mol of dicarboxylic acid and 1 mol of di-isocyanate are therefore obviously chemically equivalent to 2 mols of hydroxy and/or amino groups in the polymer. The reactions are well understood in the art, and in the polymer, as elsewhere, the bifunctional crosslinking agents should for best results be used in a total amount about equivalent to that theoretically required to react the desired number of the hydroxy and/or amino groups. A slight excess is sometimes desired in a reaction of this esterification type unless drastic conditions are present, and in a solid polymer not all of the crosslinking agent may be in position to react. Since the number of crosslinks need be very few in number to effect vulcanization of a high molecular weight polymer and the polymers may be made to vary greatly in molecular weight, no universal definite lower limit may be given where vulcanization initially occurs. Even very small amounts of bifunctional crosslinking agents, however, such as the organic polyisocyanates and organic polycarboxylic acids, have a perceptible vulcanizing effect on the polymers and the amount of crosslinking varies as the amount of these crosslinkers increase until all the hydroxy groups and equivalent amino groups are reacted. The crosslinking agent is in most cases preferably used in around the same percentages as are usual rubber vulcanizing agents, which are ordinarily present in amounts of about .1% to 5% of the weight of the rubbery polymer. The optimum amount depends on the molecular weight of the crosslinking agent and is obviously higher for higher molecular weight dicarboxylic acids. The crosslinking agent may also be present in excess, say as high as 10% of the rubbery polymer, without exerting much adverse effect, particularly when the amount of hydroxy groups is at the higher concentrations so that a sufficient number of crosslinks is formed even though some of the bifunctional reactants only partially react. Considerable excess of the bifunctional reactants obviously detracts from the crosslinking by such competing monofunctional reaction, however.

The products produced as herein described are, after removal of impurities, masticated with carbon black and vulcanizing agents.

The following examples, in which parts are by weight, illustrate the present invention.

Example 1

500 grams of hydrated sodium sulfide are dissolved in about 1 liter of water and the solution boiled with 200 grams sulfur. The polysulfide formed, which has the formula $Na_2S_{4-5}$, is diluted with water to have a specific gravity of about 1.25. About 250 grams of ethylene dichloride and about 7 grams of glycerol dichlorohydrin (the molar equivalent of about 6 or 7 grams of butadiene dichloride) are intimately mixed with about 100 grams of ethyl alcohol and the mixture is gradually added to the polysulfide solution with vigorous stirring. This mixture is heated at about 70 or 80° C. in a vessel having a reflux condenser, the reaction being completed in about two hours. The plastic product remaining after the withdrawal of the liquid is washed with water. After drying, it is mixed with 60 parts of carbon black (based on 100 parts of the rubber plastic), about 8 parts of zinc oxide, and about 5 grams of phthalic acid anhydride (about that required to completely react with the hydroxyl groups of the 7 grams of glycerol dichlorohydrin). The compounded material when cured has substantially no tendency for cold flow and has excellent resistance to chemicals.

Example 2

150 parts of ethylene dichloride are mixed with about 10 parts of propylene dichloride and 25 parts of glycerol dichlorohydrin. The mixture is added slowly, with stirring, to a dispersion of about 260 parts of sodium polysulfide in 1100 parts of water, containing about 5 parts of a stabilizing agent such as sodium alkyl naphthalene sulfonate, and about 12 parts of freshly precipitated magnesium hydroxide. The temperature of the reaction mixture is maintained at around 70° C. with constant stirring during the first part of the reaction and gradually raised, until 90° C. is reached. The latex is coagulated in the usual manner with salt and sulfuric acid, and the coagulum dried to obtain a rubbery product. The rubber product is compounded in accordance with the following formula, in which the parts are by weight:

| | Parts |
|---|---|
| Rubbery polymer | 100 |
| Zinc oxide | 5 |
| Carbon black | 60 |
| Diphenyl quanidine | .1 |
| Maleic anhydride | 4 |

The above ingredients are mixed in usual order on a cold mill, the maleic anhydride, which serves as a crosslinking agent as above described, being added last. The product is cured at the usual rubber vulcanizing temperature of 300° F. for about fifteen minutes. The cured product exhibits very little cold flow compared to the usual cured olefin polysulfide rubber products.

While the base compound is preferably entirely saturated and inasmuch as unsaturation (double bonds) apparently does not enter into any crosslinking reaction with the discarboxylic or crosslinking agents, etc., but merely decreases chemical resistance of the polymer, the base compound may contain unsaturated groups or may be a mixture of saturated and unsaturated dihalides, etc.

This application is a continuation-in-part of our prior applications Serial No. 476,214, filed February 17, 1943, and Serial No. 708,936, filed November 9, 1946.

In the above examples, the crosslinking agent used may be substituted in whole or in part by a molar equivalent of any of the above isocyanates, or above-designated acid anhydrides, or acids themselves with substantially equivalent results. The amount of crosslinking agent and the proportions of crosslinking groups in the polymer may be varied within the limits above described.

Although the invention may be employed in various ways, only preferred embodiments have been illustrated and described. Other embodiments may be made within the invention as provided by the patent statutes.

What we claim is:

1. A method of preparing a rubbery organic polysulfide polymer that is vulcanizable with polycarboxylic acid and anhydrides thereof to the elastic state generally similar to that of soft vulcanized rubber, said method including the steps of condensing an excess of an alkali metal polysulfide with a mixture of a glycerol dichlorohydrin and a lower alkylene halide to form an elastomeric product, said glycerol dichlorohydrin being present in minor proportion relative to said alkylene halide, to provide one hydroxyl group for 10 to 500 carbon atoms of said polysulfide polymer.

2. A product prepared according to claim 1.

THEODORE A. TE GROTENHUIS.
GILBERT H. SWART.

(References on following page)

REFERENCES CITED

The following references are of record in the file of this patent:

UNITED STATES PATENTS

| Number | Name | Date |
|---|---|---|
| 2,026,875 | Ellis | Jan. 7, 1936 |
| 2,195,380 | Patrick | Mar. 26, 1940 |
| 2,406,260 | Ryden | Aug. 20, 1946 |

FOREIGN PATENTS

| Number | Country | Date |
|---|---|---|
| 573,308 | Great Britain | Nov. 15, 1945 |
| 573,333 | Great Britain | Nov. 16, 1945 |
| 580,184 | Great Britain | Aug. 29, 1946 |